United States Patent [19]
Perlman et al.

[11] Patent Number: 5,288,557
[45] Date of Patent: Feb. 22, 1994

[54] PORTABLE HOOD ORNAMENT STRUCTURE

[76] Inventors: Richard I. Perlman; Marvin K. Perlman, both of 2311 Morena Blvd., San Diego, Calif. 92110

[21] Appl. No.: 6,780

[22] Filed: Jan. 21, 1993

[51] Int. Cl.⁵ .............................................. B60R 13/04
[52] U.S. Cl. ..................................... 428/31; 280/727; 40/591
[58] Field of Search .......................... 428/31; 280/727; 40/591

[56] References Cited

U.S. PATENT DOCUMENTS 5,002,810  3/1991  Birdwell et al. ...................... 428/31

Primary Examiner—Alexander S. Thomas
Attorney, Agent, or Firm—Ralph S. Branscomb

[57] ABSTRACT

A removable hood ornament is created in a manner which renders it virtually impervious to the wearing and corrosive action of time. A stock hood ornament and ornament seat element are both milled slightly. A shaft which will seat in a socket mounted on the underside of the vehicle hood is inserted up through the seat. The shaft has a threaded bifurcated top with a transverse bore therethrough which straddles the standard tongue of the ornament, with a pin passing through the bore of the shaft and through the mounting hole in the tongue to engage the shaft and tongue together. A threaded washer previously rotated onto the top of shaft is now tightened up against the underside of the ornament seat at a relatively high torque, which bends the pin and frictionally engages all of the parts together under sufficient force that for all practical purposes they will never come apart unless deliberately separated.

7 Claims, 1 Drawing Sheet

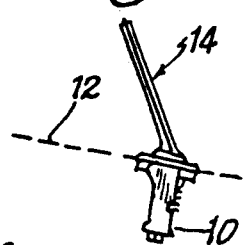
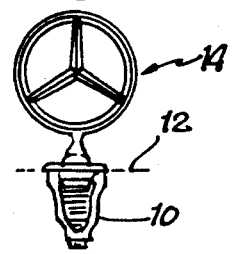
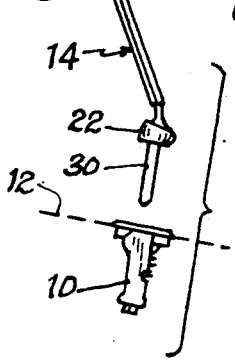
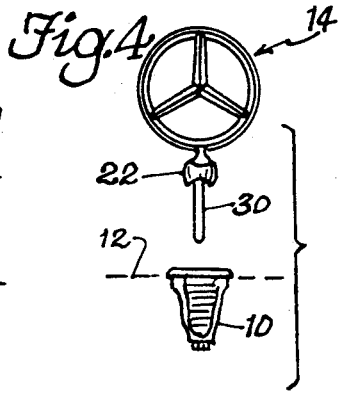
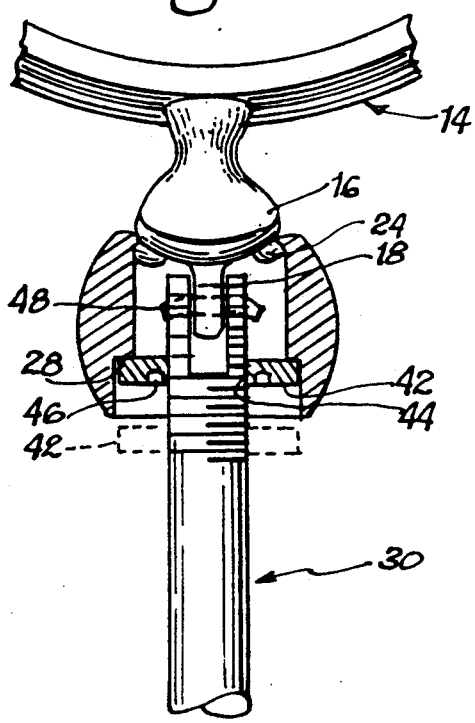
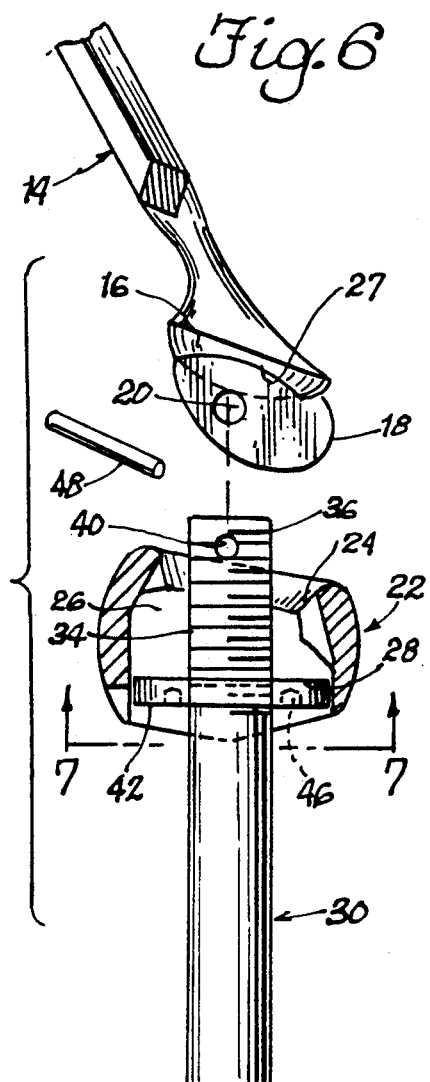
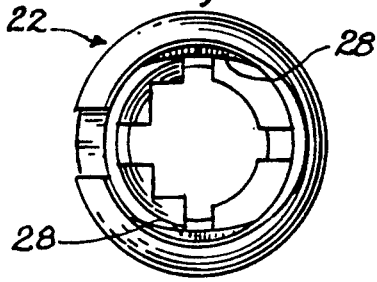

PORTABLE HOOD ORNAMENT STRUCTURE

BACKGROUND OF THE INVENTION

It is becoming increasingly popular among some elements of the population to steal hood ornaments and form a collection. This is a particular problem with Mercedes Benz ornaments due to the prestige and universal recognition that the ornament emblem conveys.

Hood ornament alarms have been designed and marketed, and the inventors of the instant removable ornament produce and successfully market such alarms. The alarms are very reliable, but as with any alarm they do not deter a thief who is undaunted by the sounding of an alarm, and who will twist the ornament off its mount whether or not an alarm is sounding.

With the advent of removable stereo systems which the owner carries out of the car with him to prevent the car from being broken into in order to steal the stereo, car owners have become familiar with the concept of removable parts which are taken off or out of the vehicle and with the driver when the vehicle is parked in a vulnerable place. Removable hood ornaments follow this trend and are becoming a popular item. The instant inventors also market a prior-art hood ornament that is removable, designed for use with the Mercedes Benz.

Prior art removable hood ornaments include at least two types. Both of these types use a depending shaft which functions as a pin to insert into a socket beneath the hood to the vehicle. The straight shaft is pushed in or pulled out at will to remove or remount the ornament.

One version connects the shaft to the ornament with a pin which is secured in place by epoxy which fills the interior cavity of the ornament seat. Although this unit works well in the beginning, the epoxy is subject to cracking and weakening with age, resulting in the separation of the parts.

The unit produced in the past by the applicants does not use epoxy, but rather silicone, which fills the internal cavity of the ornament seating element. The silicon is pressed into place with a press ring, which also maintains some compression against the silicone and the pin connection between the shaft and the tongue of the ornament. But the silicone like the epoxy is subject to deterioration with age and the pressed-on press ring can loosen and slip.

There is a need for a removable hood ornament with a sure-fire construction that does not deteriorate in strength and quality with age.

SUMMARY OF THE INVENTION

The instant invention provides such a removable hood ornament. It relies on no chemical bonding compounds for its strength, but sheer mechanical force between the parts to create positive binding action between the parts.

It is created from a stock of Mercedes Benz ornament which has a depending mounting tongue with a mounting hole therethrough, with the region at the top of the tongue, beneath the Mercedes symbol, expanding into a mounting foot. The ornament fits into a seating element which has a central cavity therethrough open at the top and bottom. The tongue of the ornament seats in the cavity, with the foot seating into the top of the seating element which forms a seat for the foot.

To make the technique work, the foot is milled out around the mounting hole in the tongue, and a shoulder is milled into the separate seating element from the bottom, around the sides of the central cavity.

After the milling, a threaded shaft is made having a rounded bottom and a threaded upper end which is bifurcated and has a transverse mounting bore therethrough. A washer having a threaded central opening which fits onto the threaded upper end of the shaft is also created. This washer is threaded all the way down onto the threaded portion of the shaft, and the top of the shaft is then inserted up through the seat so that the bifurcated top straddles the tongue, and a pin is pushed through the mounting bore in the shaft and the hole in the tongue to secure the shaft and ornament together. The threaded washer is then rotated up onto the shaft, compressing itself against the shoulder and consequently pulling the hood ornament tightly down into the seat. This creates a rigid connection between the ornament and the seat. The pin is preferably bent under the force applied by the rotated washer, so that the entire system is frictionally interengaged by this expansion under a force that will not permit a jostling free of the parts over time.

BRIEF DESCRIPTION OF THE DRAWINGS

FIG. 1 is a side elevation view of a removable hood ornament installed on a hood;

FIG. 2 is a front elevation view of the ornament of FIG. 1;

FIG. 3 is a side elevation view identical to FIG. 1 but with the ornament removed;

FIG. 4 is a front elevation view of the ornament and socket of FIG. 3;

FIG. 5 is an enlarged fragmentary view, partially in section, illustrating the seating of the ornament and its connection to the shaft;

FIG. 6 is a side view, partially exploded and partially in section, illustrating the connection of the parts of the removable ornament; and, FIG. 7 is a view taken along line 7—7 of FIG. 6 but showing only the underside of the seating element.

DETAILED DESCRIPTION OF THE PREFERRED EMBODIMENT

The removable ornament fits into a socket 10 defined beneath the hood 12 of a Mercedes Benz. The socket is a frictional unit into which the ornament will smoothly slide on its shaft but be frictionally retained until it is removed. The socket itself is not part of this invention, as it is the same socket that is and has been in use, and will not be further described.

A standard hood ornament element 14 has a foot 16 with a parallel-walled depending tongue 18 and a mounting hole 20 through the tongue. In its ordinary factory mounting, a resilient retainer pulls the ornament element down into the seating element 22 so that the foot 16 seats in the annular seat 24 defined at the top of the internal cavity 26 of the seating element. The tongue fits down inside the cavity 26. The spring-biased retainer enables the ornament to be pivoted back and forth or from side to side, and pop up into its original position so that it is not broken when it is struck.

According to the instant invention, both the stock hood ornament element 14 and the stock seating element 22 are modified slightly. The ornament element is modified by removing an ovate layer of stock from both sides of the tongue to produce cutaway regions 27, which decreases the size of the foot and expands the sides of the tongue, creating clearance around the mounting hole 20 of the tongue.

The seating element 22 is modified by milling in axially with a circular bit through the bottom, as best shown in FIG. 5, creating a partial cylinder shoulder 28 in the walls of the internal cavity.

This having been done to both parts, two other specially prepared parts are incorporated into the structure. First, a shaft 30 having a rounded bottom end 32 which fits into the socket 10 is made. The shaft has a transverse mounting bore at its upper end, and also is threaded at its upper portion 34 and bifurcated to produce a slot. The second custom element that is used is a washer 42 which has a threaded central hole 44 and a pair of spanner tool holes 46.

The washer 42 is rotated down onto the top of the shaft, either as far as it will go or at least far enough to provide adequate clearance for the mounting bore 40 on top of the mounting element so that a pin 48 can be inserted through the bore. Then, the shaft is inserted into the bottom of the seating element up through the cavity until the washer seats on the shoulder 28 and the bore 40 is clear of the top of the seating element. In this position, the tongue of the ornament element is inserted into the slot 38 of the shaft and the pin is inserted through the aligned bore and hole in the shaft and tongue, respectively. The pin is preferably solid, such as solid brass, and a frictional fit is helpful but not absolutely necessary.

Once the pin is in place, the final step is the rotation of the threaded washer 44 with a spanner tool, rotating the washer so it moves in the up direction on the shaft. As it bears against the shaft as shown in FIG. 5, it holds the tongue of the ornament element down into the cavity 26 of the seating element. The washer is rotated to a relatively high torque, to the point at which the pin 48 bends as shown in FIG. 5. This relatively high expansive force create considerable surface-to-surface friction among the parts of the structure. Because all of the parts are metal and thus slightly springy, there is a lock-washer effect, creating an axial grip between the parts which is effective in perpetually, or at least indefinitely, preventing them from separating.

Thus, although the part is simple in construction, it solves a need that has been long felt in the removable hood ornament trade. The need has been felt, but not addressed, probably due to the fact that existing removable hood ornaments work well for a period of time right after they have been sold, and there has been no incentive on manufacturer's to improve their durability. Secondly, it is a small product in a small niche market and is not subject to the high-pressure creative forces that eventually inevitably lead to the improvement of mass market items. It is a product whose time has come, and which will represent a substantial and welcome change in a small niche of the lives of a portion of the auto driving public.

It is hereby claimed:

1. A removable hood ornament structure for insertion into a retainer socket mounted to the under side of a hood, said structure comprising:
   (a) an ornament element having a seating foot with a tongue depending therefrom with a mounting hole passing therethrough;
   (b) a seating element having a central cavity open through the top and bottom of said seating element and defining a seat for said foot at the top of said cavity and receiving said tongue in said cavity;
   (c) a mounting shaft having a lower end insertable into said socket and a threaded bifurcated upper end with a transverse bore through the bifurcations of said upper end, and a retaining pin passing through said bore and mounting hole;
   (d) said seating element defining a downwardly-directed shoulder around said cavity; and,
   (e) a threaded washer engaged on a threaded upper end of said shaft and seated against said shoulder and being rotated onto said shaft to bear against said shoulder, pulling said bifurcated end, retainer pin and tongue downward into said seating element in tight expansive frictional engagement.

2. Structure according to claim 1 wherein said washer has a pair of downwardly-directed spanner wrench holes.

3. Structure according to claim 1 wherein said pin is solid brass.

4. Structure according to claim 1 wherein said ornament element is a standard Mercedes Benz ornament element with said foot being milled away from said mounting hole on both sides of said tongue to provide clearance for the top of said shaft.

5. Structure according to claim 1 wherein said seating element is a standard Mercedes Benz seating element having said shoulder milled into same through the open bottom of said cavity.

6. A method of modifying a standard Mercedes Benz hood ornament element having a seating foot and a depending tongue with a mounting hole passing therethrough, and a hood ornament seating element having a central cavity open through the top and bottom of said seating element and defining an ornament element seat and combining same into a removable hood ornament structure seatable in a socket mounted to the under side of a Mercedes Benz hood, comprising the following steps:
   (a) machining away stock at the bottom central regions of said foot away from said mounting hole in said tongue to enlarge said tongue and increase the clearance between said mounting hole and said foot;
   (b) machining a shoulder into the inner walls of said cavity through the open bottom thereof;
   (c) creating a threaded shaft having a threaded bifurcated upper end with a transverse mounting bore therethrough and a lower end for seating into said socket;
   (d) taking a washer having a threaded central bore and being dimensioned to seat inside said cavity from the bottom against said shoulder and threading it onto the top end of said shaft far enough to permit said upper end of said shaft to extend up through said cavity such that said mounting bore clears said seating element;
   (e) inserting said threaded upper end of said shaft up into said cavity until said washer seats against said shoulder;
   (f) straddling said bifurcated end around said tongue such that said mounting bore and mounting hole are substantially aligned;
   (g) inserting a pin through said aligned mounting bore and hole; and
   (h) rotating said washer to draw said shaft downward, thereby bringing said washer into compression against said shoulder and exerting expansion forces on said pin and tongue to create a frictional lock of said shaft, pin, tongue and seating element together such that same comprise an integral unit to be selectively installed or uninstalled on a Mercedes Benz hood by seating or unseating the lower end of said shaft in said socket.

7. A method according to claim 6 wherein said washer has two opposed holes in one face thereof and step (f) comprises engaging a spanner tool in said holes and rotating same to tighten up said washer.

* * * * *